United States Patent
DiMaria (10) Patent No.: US 11,521,623 B2
(45) Date of Patent: Dec. 6, 2022

(54) SYSTEM AND METHOD FOR SINGLE-SPEAKER IDENTIFICATION IN A MULTI-SPEAKER ENVIRONMENT ON A LOW-FREQUENCY AUDIO RECORDING

(71) Applicant: Bank of America Corporation, Charlotte, NC (US)

(72) Inventor: Steven Mark DiMaria, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 187 days.

(21) Appl. No.: 17/145,474

(22) Filed: Jan. 11, 2021

(65) Prior Publication Data

US 2022/0223157 A1     Jul. 14, 2022

(51) Int. Cl.
  *G10L 17/00* (2013.01)
  *G10L 17/06* (2013.01)
  *G10L 15/02* (2006.01)

(52) U.S. Cl.
  CPC .............. *G10L 17/06* (2013.01); *G10L 15/02* (2013.01)

(58) Field of Classification Search
  None
  See application file for complete search history.

(56) References Cited

U.S. PATENT DOCUMENTS

| | | | |
|---|---|---|---|
| 7,266,501 B2 | 9/2007 | Saunders et al. | |
| 7,379,552 B2 | 5/2008 | Neervoort et al. | |
| 7,676,044 B2 | 3/2010 | Sasaki et al. | |
| 7,756,281 B2 | 7/2010 | Goldstein et al. | |
| 7,995,732 B2 | 8/2011 | Koch et al. | |
| 8,170,193 B2 | 5/2012 | Curry et al. | |
| 8,306,814 B2 | 11/2012 | Dobry | |
| 8,311,226 B2 | 11/2012 | Lorgeoux et al. | |
| 8,311,233 B2 | 11/2012 | Kinghorn | |
| 8,560,309 B2 | 10/2013 | Pance et al. | |
| 8,775,177 B1 * | 7/2014 | Heigold | G10L 15/10 704/270.1 |

(Continued)

OTHER PUBLICATIONS

Li Wan, "Generalized End-To-End Loss For Speaker Verification", arXiv:1710.10467v5 [eess.AS], https://arxiv.org/pdf/1710.10467.pdf, Nov. 9, 2020, 5 pages.

(Continued)

*Primary Examiner* — Jakieda R Jackson (57) ABSTRACT

A system for identifying a speaker in a multi-speaker environment comprises a processor operably coupled with a memory. The system receives a request to identify a first speaker in an audio file. The system splits the audio file into audio snippets based on a probability of each audio snippet comprising one or more utterances being above a threshold percentage. For each audio snippet, the system generates a frequency representation of the audio snippet in a time domain. The system generates a feature vector of numerical values representing voice features associated with one or both of the first speaker and the second speaker. The system determines whether the feature vector corresponds to the target vector labeled with the first speaker. In response to determining that the feature vector corresponds to the target vector, the system determines that one or more utterances in the audio snippet are spoken by the first speaker.

20 Claims, 3 Drawing Sheets

(56) References Cited

U.S. PATENT DOCUMENTS

| | | |
|---|---|---|
| 8,824,688 B2 | 9/2014 | Schreiner et al. |
| 8,983,836 B2 | 3/2015 | Woodward et al. |
| 9,020,153 B2 | 4/2015 | Britt, Jr. |
| 9,154,877 B2 | 10/2015 | Kim et al. |
| 9,154,896 B2 | 10/2015 | Mahabub et al. |
| 9,319,019 B2 | 4/2016 | Selig et al. |
| 9,338,420 B2 | 5/2016 | Xiang |
| 9,372,251 B2 | 6/2016 | Soulodre |
| 9,384,741 B2 | 7/2016 | Morrell et al. |
| 9,412,385 B2 | 8/2016 | Sen et al. |
| 9,426,599 B2 | 8/2016 | Walsh et al. |
| 9,462,399 B2 | 10/2016 | Bharitkar et al. |
| 9,495,968 B2 | 11/2016 | Sen et al. |
| 9,519,454 B2 | 12/2016 | Reimann |
| 9,532,158 B2 | 12/2016 | Lando et al. |
| 9,584,946 B1 | 2/2017 | Lyren et al. |
| 9,622,009 B2 | 4/2017 | Robinson et al. |
| 9,681,247 B2 | 6/2017 | Ward et al. |
| 9,723,260 B2 | 8/2017 | Feng |
| 9,852,737 B2 | 12/2017 | Kim et al. |
| 9,858,927 B2 | 1/2018 | Williams et al. |
| 9,870,778 B2 | 1/2018 | Peters et al. |
| 9,883,310 B2 | 1/2018 | Peters et al. |
| 9,996,628 B2 | 6/2018 | Ramnath Krishnan et al. |
| 9,997,164 B2 | 6/2018 | France et al. |
| 10,003,907 B2 | 6/2018 | Breebaart et al. |
| 10,109,280 B2 | 10/2018 | Sidi et al. |
| 10,140,991 B2 | 11/2018 | Sharifi et al. |
| 10,148,317 B2 | 12/2018 | Krug et al. |
| 10,178,489 B2 | 1/2019 | Sen et al. |
| 10,194,187 B2 | 1/2019 | Ikezoye et al. |
| 10,231,074 B2 | 3/2019 | Baalu et al. |
| 10,304,466 B2 | 5/2019 | Hatanaka et al. |
| 10,347,238 B2 * | 7/2019 | Jin .................... G10L 21/00 |
| 10,446,156 B2 | 10/2019 | Ziv et al. |
| 10,546,590 B2 | 1/2020 | Sharma et al. |
| 10,726,848 B2 | 7/2020 | Gorodetski et al. |
| 10,743,125 B2 | 8/2020 | Crockett et al. |
| 11,069,352 B1 * | 7/2021 | Tang .................... G10L 15/22 |
| 2014/0369519 A1 | 12/2014 | Leschka et al. |
| 2015/0195663 A1 | 7/2015 | Lin et al. |
| 2017/0287482 A1 | 10/2017 | Jackson |

OTHER PUBLICATIONS

Ye Jia, Transfer Learning from Speaker Verification to Multispeaker Text-To-Speech Synthesis, arXiv:1806.04558v4 [cs.CL], https://arxiv.org/pdf/1806.04558.pdf, Jan. 2, 2019, 15 pages.

Hareesh Bahuleyan, "Music Genre Classification using Machine Learning Techniques", arXiv:1804.01149v1 [cs.SD], https://arxiv.org/pdf/1804.01149.pdf, Apr. 3, 2018, 12 pages.

Leland McInnes, "UMAP: Uniform Manifold Approximation and Projection for Dimension Reduction", arXiv:1802.03426v3 [stat.ML], https://arxiv.org/pdf/1802.03426.pdf, Sep. 18, 2020, 63 pages.

"A python package to analyze and compare voices with deep learning", https://github.com/resemble-ai/Resemblyzer, © 2020 GitHub, Inc., 6 pages.

"Welcome to pysox's documentation!—pysox 1.3.7 documentation", https://pysox.readthedocs.io/en/docs-v1.3.7/, © 2016, Rachel Bittner, 1 page.

"CMUSphinx Open Source Speech Recognition", Open Source Speech Recognition Toolkit; https://cmusphinx.github.io/, Apr. 12, 2017, 2 pages.

"DeepSpeech is an open source embedded (offline, on-device) speech-to-text engine which can run in real time on devices ranging from a Raspberry Pi 4 to high power GPU servers", Mozilla, https://github.com/mozilla/DeepSpeech, © 2020 GitHub, Inc., 2 pages.

Awni Hannun, et al., "Deep Speech: Scaling up end-to-end speech recognition", arXiv:1412.5567v2 [cs.CL], https://arxiv.org/pdf/1412.5567.pdf, Dec. 19, 2014, 12 pages.

* cited by examiner

SYSTEM AND METHOD FOR SINGLE-SPEAKER IDENTIFICATION IN A MULTI-SPEAKER ENVIRONMENT ON A LOW-FREQUENCY AUDIO RECORDING

TECHNICAL FIELD

The present disclosure relates generally to speaker identification, and more specifically to a system and method for single-speaker identification in a multi-speaker environment on a low-frequency audio recording.

BACKGROUND

It is challenging to identify speakers in low-frequency audio recordings. Low-frequency audio recordings have a low sampling frequency and carry static background noise that makes the speaker identification process difficult. In some cases, an audio recording may contain a lengthy conversation between multiple speakers. As such, it is also time-consuming and requires large amounts of processing resources to process large numbers of audio recordings or lengthy audio files to identify speakers. Current speaker identification technologies may not be configured to overcome these challenges and provide a reliable and efficient solution for identifying speakers.

SUMMARY

Current speaker identification technologies may not be configured to provide a reliable and efficient solution for identifying speakers in one or more low-frequency audio recordings. The present disclosure contemplates systems and methods for identifying a speaker in one or more low-frequency audio recordings. Low-frequency audio recordings have a low sampling frequency, which means that less voice features or voiceprints can be extracted compared to audio recordings with a high sampling frequency. Furthermore, low-frequency audio recordings carry static background noise which makes the process of the speaker identification difficult. The present disclosure contemplates upsampling low-frequency audio recordings so that the audio recordings have a high sampling rate. Therefore, the disclosed system may be configured to identify speakers in live low-frequency audio recordings, such as live phone calls, live audio streams, and the like.

To this end, the disclosed system splits the audio recording into a plurality of audio snippets based on a probability of each audio snippet comprising one or more utterances being above a threshold percentage, e.g., 80%. Each audio snippet may contain one or more utterances of one or more speakers. The disclosed system abstracts probabilistically determining how short each audio snippet can be to include one or more utterances. In this way, the disclosed system obviates the need for performing speaker diarization that is used in the current speaker identification technologies. The speaker diarization technique operates on detecting speaker change points in the audio file and homogeneously segmenting the audio file according to each speaker's identity. However, the speaker diarization technique may not provide reliable results on low-frequency audio files.

In some cases, an audio recording may contain a lengthy conversation between multiple speakers. Processing the entire such audio recording may consume a large amount of processing power and time. As such, to determine whether the audio recording contain speech of a particular speaker, the disclosed system may truncate the audio recording and determine whether the truncated audio recording contains the speech of the particular speaker. In this way, the disclosed system may reduce the processing power and time for processing the audio recording, that would otherwise be spent on processing the entire audio recording.

Once the audio snippets are prepared, the disclosed system may generate a frequency representation of each audio snippet. For example, the frequency representation may correspond to the Mel Frequency Cepstral Coefficients (MFCC) representation of the audio snippet. The frequency representation of the audio snippet represents power spectrum or amplitudes of audio signals in the audio snippet in a time domain. The disclosed system may generate a frequency representation vector or embedding by feeding the frequency representation of the audio snippet to a neural network. The disclosed system may perform a linear transformation on the frequency representation vector to generate a feature vector. The linear transformation operation may comprise feeding the frequency representation vector to a neural network. The feature vector may represent voice features or voiceprints of one or more speakers in the audio snippet.

The disclosed system compares the feature vector with a target vector that is labeled with the particular speaker who is desired to be identified in the audio recording. The target vector may be determined by processing target audio snippets (or historical audio snippets) that contain one or more utterances of the particular speaker. The disclosed system determines whether the feature vector corresponds to the target vector. If the disclosed system determines that the feature vector corresponds to the target vector, the disclosed system determines that one or more utterances in the audio snippet are spoken by the particular speaker.

In an embodiment, a system for identifying a speaker in a multi-speaker environment comprises a processor operably coupled with a memory. The memory is operable to store an audio file comprising a conversation among at least two speakers comprising a first speaker and a second speaker. The processor is configured to receive a request to identify the first speaker in the audio file. The processor splits the audio file into a plurality of audio snippets based at least in part upon a probability of each audio snippet comprising one or more utterances being above a threshold percentage.

For each audio snippet from the plurality of audio snippets, the processor generates a frequency representation of the audio snippet in a time domain, wherein the frequency representation indicate amplitudes of audio signals in the audio snippet. The processor generates, from the frequency representation, a feature vector of numerical values representing voice features associated with one or both of the first speaker and the second speaker. A voice feature associated with a particular speaker comprises at least one of a frequency range, a speech distribution pattern, and speech pauses associated with the particular speaker. The processor compares the feature vector with a target vector that is labeled with the first speaker, where the target vector comprises numerical values representing a voice feature associated with first speaker. The processor determines whether the feature vector corresponds to the target vector. In response to determining that the feature vector corresponds to the target vector, the processor determines that one or more utterances in the audio snippet are spoken by the first speaker.

The disclosed system provides several practical applications and technical advantages which include: 1) technology that non-deterministically splits an audio file into a plurality of audio snippets, such that a duration of each audio snippet from the plurality of audio snippets is probabilistically determined to ascertain how short each audio snippet can be to include one or more utterances; 2) technology that probabilistically determines a length to truncate the audio file into based on speech distribution pattern of a particular speaker who is desired to be identified; 3) technology that extracts voice features of the particular speaker from a frequency representation of an audio snippet, where the voice features comprises a tone range, a frequency range, speech pauses, and speech patterns associated with the particular speaker; and 4) technology that obviates the need for performing the speaker diarization for identifying one or more speakers in the audio file.

As such, this disclosure may improve the operation of the speaker identification process and the function of computer systems used for identifying speakers in audio files. For example, the system described in this disclosure may decrease processing resources and time required to process audio files. The system described in this disclosure may also improve the accuracy of results of the speaker identification process by obviating the need for performing the speaker diarization which may not provide reliable speaker identifications.

The system may also reduce or eliminate practical and technical barriers for identifying a particular speaker in large amounts of audio files and/or in lengthy audio files by truncating the audio files and determining whether each truncated audio file contains speech of a particular speaker. The system described in this disclosure may be integrated into a practical application of evaluating one or more audio files to determine whether they contain speech of a particular speaker.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
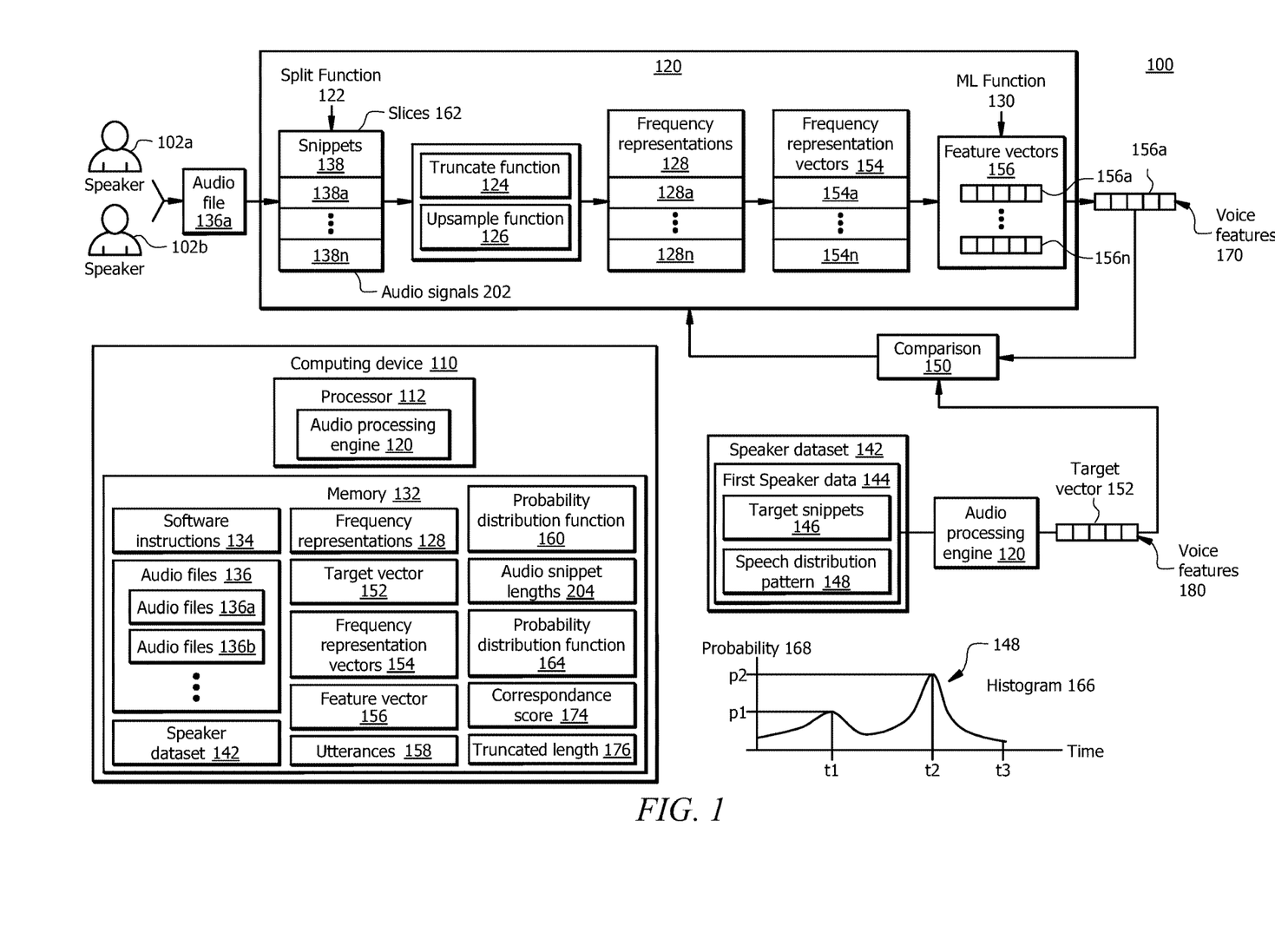
FIG. 1 illustrates an embodiment of a system configured to identify a speaker in one or more audio files.

FIG. 1 illustrates one embodiment of a system 100 that is configured to identify a speaker 102 in a multi-speaker environment, such as an audio file 136. In one embodiment, system 100 comprises a computing device 110. The computing device 110 comprises a processor 112 in signal communication with a memory 132. Memory 132 comprises software instructions 134 that when executed by the processor 112 cause the processor 112 to perform one or more functions described herein. For example, when the software instructions 134 are executed, the processor 112 executes an audio processing engine 120 to identify a speaker 102 in an audio file 136. In other embodiments, system 100 may not have all of the components listed and/or may have other elements instead of, or in addition to, those listed above.

In general, system 100 (via the audio processing engine 120) receives a request to identify a particular speaker 102 in one or more audio files 136. For example, assume that the audio processing engine 120 receives a request to identify a first speaker 102*a* in one or more audio files 136. The audio files 136 may comprise, for example, an audio recording, a live phone call, an audio stream, etc. The audio processing engine 120 selects an audio file 136 from the audio files 136. The audio processing engine 120 splits the audio file 136 into a plurality of audio snippets 138 based on a probability that each audio snippet 138 comprising one or more utterances 158 being above a threshold percentage, e.g., 85%. The audio processing engine 120 selects an audio snippet 138 from the plurality of audio snippets 138 to determine whether the selected audio snippet 138 contains one or more utterances 158 spoken by the first speaker 102*a*. To this end, the audio processing engine 120 generates a frequency representation 128 from the audio snippet 138. The frequency representation 128 may indicate amplitudes of audio signals 202 in the audio snippet 138 in a time domain. The audio processing engine 120 generates an embedding or a vector 154 from the frequency representation 128 comprising numerical values from the frequency representation 128. The audio processing engine 120 may generate the frequency representation vector 154 by feeding the frequency representation 128 to a neural network. The audio processing engine 120 generates a feature vector 156 from the frequency representation vector 154, for example, by performing a linear transformation on the frequency representation vector 154. In this process, the audio processing engine 120 extracts voice signatures or voiceprints 170 associated with one or more speakers 102 whose one or more utterances 158 were detected in the audio snippet 138. The audio processing engine 120 compares the feature vector 156 with a target vector 152 that is pre-processed and labeled with the first speaker 102*a*. For example, the target vector 152 may be generated from a first speaker data 144 that is used to identify the first speaker 102*a* in one or more audio files 136. The target vector 152 comprises numerical values representing voice signature or voiceprint 180 associated with the first speaker 102*a*. The audio processing engine 120 determines whether the feature vector 156 corresponds to the target vector 152. For example, the audio processing engine 120 may determine whether the feature vector 156 corresponds to the target vector 152 by performing an inner product (.) between them. The result from performing the inner product (.) between the feature vector 156 and the target vector 152 may indicate a similarity or correspondence between them. If it is determined that the feature vector 156 corresponds to the target vector 152, the audio processing engine 120 determines that one or more utterances 158 in the audio snippet 138 are spoken by the first speaker 102*a*. If it is determined that the feature vector 156 does not correspond to the target vector 152, the audio processing engine 120 determines that one or more utterances 158 in the audio snippet 138 are not spoken by the first speaker 102*a*.

System Components

Computing device 110 is generally any device that is configured to process data and interact with users. Examples of computing device 110 include, but are not limited to, a personal computer, a desktop computer, a workstation, a server, a laptop, a tablet computer, a mobile phone (such as smartphones), etc. In a particular example, the computing device 110 may be a desktop computer from which a user send a request to the audio processing engine 120 to identify a speaker 102 in one or more audio files 136.

Processor 112 comprises one or more processors operably coupled to the memory 132. The processor 112 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 112 may be a programmable logic device, a microcontroller, a microprocessor, or any suitable combination of the preceding. The one or more processors are configured to process data and may be implemented in hardware or software. For example, the processor 112 may be 8-bit, 16-bit, 32-bit, 64-bit, or of any other suitable architecture. The processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 134) to implement the audio processing engine 120. In this way, processor 112 may be a special-purpose computer designed to implement the functions disclosed herein. In an embodiment, the processor 112 is implemented using logic units, FPGAs, ASICs, DSPs, or any other suitable hardware. The processor 112 is configured to operate as described in FIGS. 1-3. For example, the processor 112 may be configured to perform one or more steps of method 300 as described in FIG. 3.

Memory 132 may be volatile or non-volatile and may comprise a read-only memory (ROM), random-access memory (RAM), ternary content-addressable memory (TCAM), dynamic random-access memory (DRAM), and static random-access memory (SRAM). Memory 132 may be implemented using one or more disks, tape drives, solid-state drives, and/or the like. Memory 132 is operable to store the software instructions 134, audio files 136, speaker dataset 142, frequency representations 128, target vector 152, features vector 156, utterances 158, probability distribution function 160, probability distribution function 164, correspondence score 174, a truncated length 176 for truncating an audio file 136, and/or any other data or instructions. The software instructions 134 may comprise any suitable set of instructions, logic, rules, or code operable to execute the processor 112.

Audio files 136 may generally comprise an audio recording, a live phone call, an audio stream, a live meeting, or any media that includes speech of one or more speakers 102. In some examples, an audio file 136, such as a phone call may have a low sampling frequency, such as 8 Khz sampling frequency. This means less voice features or voiceprints 170 can be extracted from such audio files 136 compared to audio files 136 with a higher sampling frequency. Thus, extracting voice features 170 from audio files 136 with a low-frequency sampling may result in inaccurate results for identifying a speaker 102. As such, the audio processing engine 120 may upsample audio files 136 with a low-frequency sampling rate by multiplying their sampling frequency rates with an integer. For example, the audio processing engine 120 may upsample an audio file 136 with 8 Khz sampling frequency by multiplying its sampling frequency by two, resulting in the audio file 136 to have a 16 Khz sampling frequency. The process of upsampling an audio file 136 is described in more detail further below.

Speaker dataset 142 may comprise speaker metadata of a speaker 102 that is desired to be identified in one or more audio files 136. For example, the speaker dataset 142 may comprise the first speaker data 144. The first speaker data 144 may comprise target snippets 146 and speech distribution pattern 148 associated with the first speaker 102a. The target snippets 146 may comprise one or more target snippets 146 that are labeled with the first speaker 102a, meaning that the target snippets 146 are historical audio snippets 138 that have been identified to contain one or more utterances 158 of the first speaker 102a, for example, by a user and/or the audio processing engine 120 by implementing unsupervised and/or supervised machine learning techniques. The process of generating the target snippet 148 may be similar to the process of generating the feature vector 156 which is described further below.

The speech distribution pattern 148 may represent how often the first speaker 102a speaks, and probabilities of the first speaker 102a speaking at different times during an audio file 136. The audio processing engine 120 may determine the speech distribution pattern 148 associated with the first speaker 102a by processing multiple audio files 136 that include the speech of the first speaker 102a. The audio processing engine 120 may use the speech distribution pattern 148 for pre-processing one or more audio files 136 prior to the speaker identification process. For example, the audio processing engine 120 may use the speech distribution pattern 148 to determine a length 176 to truncate the audio file 136 thereto.

In some cases, an audio file 136 may comprise a lengthy conversation between multiple speakers 102. As such, the audio processing engine 120 may truncate the audio file 136 to determine whether the first speaker 102a (that is desired to be identified) speaks in the truncated audio file 136. Details of the truncating operation using the speech distribution pattern 148 are described further below. In brief, the audio processing engine 120 may use the speech distribution pattern 148 to determine a length to truncate an audio file 136 thereto, such that a probability of the truncated audio file 136 comprising at least one utterance 158 spoken by the first speaker 102a is above a threshold percentage, such as 70%.

From the speaker dataset 142, the audio processing engine 120 determines the target vector 152. The target vector 152 may represent the speech model, voiceprint, or voice signature 180 associated with the first speaker 102a. The voice signature 180 may comprise one or more indications indicating a tone range, frequency range, pitch range, pauses in the speeches of the first speaker 102a, among other indications.

Audio Processing Engine

Audio processing engine 120 may be implemented by the processor 112 executing software instructions 134, and is generally configured to identify a speaker 102 in one or more audio files 136. In one embodiment, the audio processing engine 120 may be implemented by a plurality of neural network (NN) layers, Convolutional NN (CNN) layers, Long-Short-Term-Memory (LSTM) layers, Bi-directional LSTM layers, Recurrent NN (RNN) layers, and the like.

In one embodiment, the audio processing engine 120 may identify a particular speaker 102, such as the first speaker 102a in each audio file 136 from the one or more audio files 136 by: 1) splitting the audio file 136 into a plurality of snippets 138, 2) selecting a snippet 138 from the plurality of snippets 138, 3) generating a frequency representation 128 of the selected snippet 138, 4) generating an embedding or a vector 154 of numerical values from the frequency representation 128, 5) generating a feature vector 156 representing the voiceprint 170 associated with one or more speakers 102, and 6) comparing the feature vector 156 with a target vector 152 that is labeled with the first speaker 102a. If the audio processing engine 120 determines that the feature vector 156 corresponds to the target vector 152, the audio processing engine 120 determines that one or more utterances 158 in the selected audio snippet 138 are uttered by the first speaker 102a. In other words, the audio processing engine 120 associates the selected audio snippet 138 to the first speaker 102a, indicating that the selected audio snippet 138 contains one or more utterances 158 spoken by the first speaker 102a. Otherwise, the audio processing engine 120 determines that one or more utterances 158 in the selected audio snippet 138 are not uttered by the first speaker 102a. In this case, the audio processing engine 120 moves on to process the next audio snippet 138. The corresponding description below describes the operational flow of the system 100 to perform the operations enumerated above.

Operational Flow

Splitting the Audio File into Snippets

In one embodiment, the operational flow begins when the audio processing engine 120 splits the audio file 136 into a plurality of snippets 138. The audio processing engine 120 may split the audio file 136 into the plurality of snippets 138 by executing a split function 122. In one embodiment, the audio processing engine 120 may determine a corresponding length of each audio snippet 138 by probabilistically determining how short each audio snippet 138 can be to include one or more utterances 158. To this end, the audio processing engine 120 may apply a first probability distribution function 160 on the audio file 136 to determine a corresponding length 204 of each snippet 138, such that a probability of each snippet 138 comprising one or more utterances 158 is above a threshold percentage, such as 85%.

To determine a corresponding length 204 for a snippet 138 with a probability of comprising one or more utterances 158 above the threshold percentage, the audio processing engine 120 may split the audio file 136 into a plurality of audio slices 162 with short lengths, such as within milliseconds range. The audio processing engine 120 may determine a length 204 of an audio snippet 138 when a probability of occurring at least one utterance 158 (or a portion of an utterance 158) in above a threshold number of audio slices 162 in a row is above a threshold percentage, such as 85%. The audio processing engine 120 may further determine the length 204 of the audio snippet 138 such that a ratio of a sum of durations in which one or more utterances 158 are detected over a sum of durations in which no utterances 158 are detected is above a threshold percentage, such as 80%. As such, corresponding lengths 204 of audio snippets 138 may be probabilistically determined to ascertain how short each audio snippet 138 can be to include one or more utterances 158. An example method of determining a length 204 of an audio snippet 138 is described in the corresponding description below in conjunction with FIG. 2.

Figure 2:
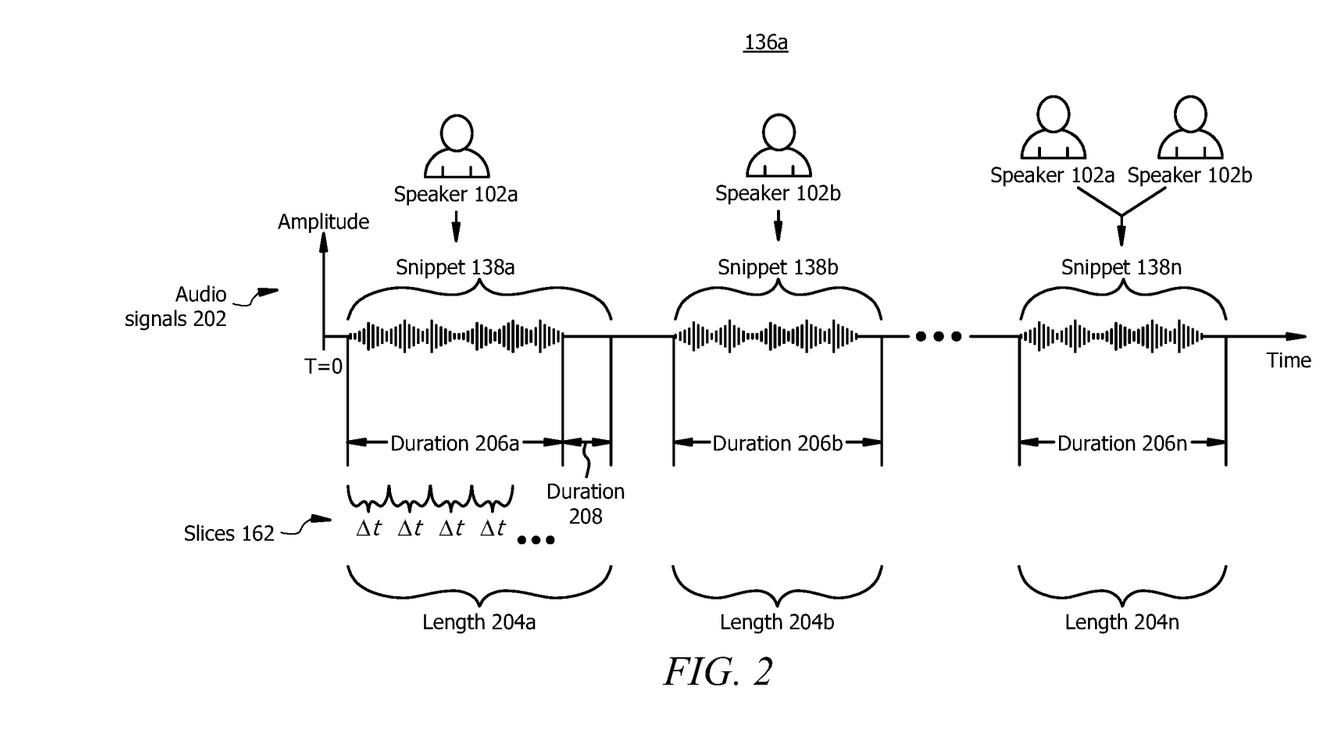
FIG. 2 illustrates an example representation of an audio file.

Referring to FIG. 2, an example representation of the first audio file 136a is illustrated, where the x-axis represents time, and the y-axis represents amplitudes of audio signals 202. For example, to determine a length 204a for the first snippet 138a, the audio processing engine 120 splits the audio file 136 into a plurality of slices 162 each with a duration of Δt, where Δt may be in milliseconds range, such as ten millisecond, twenty milliseconds, or any other suitable duration. The audio processing engine 120, then, determines whether each of the audio slices 162 comprises an utterance 158 (or a portion of an utterance 158) by determining a change in the amplitudes of audio signals 202 in each audio slice 162. The audio processing engine 120 determines the length 204a for the first snippet 138a when the number of audio slices 162 in which an utterance 158 (or a portion of an utterance 158) is detected in a row is above a threshold number.

The audio processing engine 120 may also determine the length 204a for the first snippet 138a such that a ratio of durations in which one or more utterances 158 are detected over durations in which no utterance 158 is detected is above a threshold percentage. For example, the audio processing engine 120 determines a length of a first duration 206a in which the audio slices 162 comprising one or more utterances 158 are detected; and length of a second duration 208 in which no utterances 158 are detected. The audio processing engine 120 determines the length 204a (for the first audio snippet 138a) when a ratio of the first duration 206a over the second duration 208 is above a threshold percentage, e.g., 80%. The audio processing engine 120 performs a similar procedure to determine lengths 204 for other audio snippets 138.

Truncating the Audio File

Referring back to FIG. 1, in some cases, an audio file 136, for example, the first audio file 136a, may comprise a lengthy conversion between multiple speakers 102, for example, between the first speaker 102a and the second speaker 102b. As such, the audio processing engine 120 may truncate the first audio file 136a to determine whether the first speaker 102a (that is desired to be identified) speaks in the truncated audio file 136. If the audio processing engine 120 determines that the first speaker 102a does not speak in the truncated first audio file 136a, the audio processing engine 120 determines that the first audio file 136a does not contain speech of the first speaker 102a, and may proceed to a second audio file 136b. For example, the audio processing engine 120 may truncate the first audio file 136a by executing a truncate function 124.

In this process, the audio processing engine 120 may apply a second probability distribution function 164 on the first audio file 136a to determine a corresponding length 176 to truncate the audio file 136 thereto, such that a probability of the first speaker 102a speaking in the truncated first audio file 136a is above a threshold percentage, e.g., 70%. The length 176 for truncating first audio file 136a may vary based on a speech pattern or speech distribution pattern 148 of the particular speaker 102 that is desired to be identified. For example, assuming that the audio processing engine 120 is requested to identify the first speaker 102a, the audio processing engine 120 may use the speech distribution pattern 148 (that is associated with the first speaker 102a) to determine a length 176 to truncate the first audio file 136a thereto.

The speech distribution pattern 148 may be represented by a histogram 166 as illustrated in FIG. 1. As described above, the speech distribution pattern 148 may represent how often the first speaker 102a speaks, and probabilities of the first speaker 102a speaking at different times during an audio file 136. In the example histogram 166, the x-axis represents time, and the y-axis represents a probability 168 (or an average probability 168) of the first speaker 102a speaking at different times during an audio file 136. In the illustrated example, histogram 166 indicates that a probability 168 (or an average probability 168) of the first speaker 102a speaking at t1 is p1 (e.g., 40%), and at t2 is p2 (e.g., 80%). The audio processing engine 120 may use this information to determine the length 176 to truncate the audio file 136 thereto, such that the probability 168 of the truncated audio file 136 comprising at least one utterance 158 spoken by the first speaker 102a is above a threshold percentage, such as 70%. Based on the example histogram 166 of FIG. 1, the audio processing engine 120 may truncate the audio file 136 at t3 because the probability (p2) at t2 is above the threshold percentage, e.g. 70%.

As such, in some embodiments, the length 176 to truncate an audio file 136 may depend on a particular speaker 102 that is desired to be identified in the audio file 136 and the speech distribution pattern 148 associated with the particular speaker 102. For example, a length 176 for truncating the first audio file 136a for identifying the first speaker 102a may be different than a length 176 for truncating the first audio file 136a for identifying the second speaker 102b.

Upsampling the Audio File

In one embodiment, the audio processing engine 120 may perform an upsampling operation on the audio file 136 (or truncated audio file 136), such that a sampling frequency of audio signals 202 in the audio file 136 (or truncated audio file 136) is multiplied by an integer, similar to that described above. The audio processing engine 120 may perform the upsampling operation by executing an upsampling function 126.

Generating a Frequency Representation Embedding

In one embodiment, the audio processing engine 120 may generate a frequency representation 128 from the audio snippet 138, where the frequency representation 128 may represent a power spectrum or amplitudes of audio signals 202 in the audio snippet 138 in a time domain. In one embodiment, the audio processing engine 120 may generate the frequency representation 128 by taking a Fast Fourier Transform (FFT), performing a Discrete Cosine Transform (DCT), filtering the audio snippet 138, among other methods. In a particular example, the frequency representation 128 may correspond to the Mel Frequency Cepstral Coefficients (MFCC) representation of the audio snippet 138.

Once the frequency representation 128 is generated, the audio processing engine 120 may generate an embedding or a vector 154 representing the frequency representation 128. In one embodiment, the audio processing engine 120 may generate the frequency representation vector 154 by performing a vectorization operation on the frequency representation 128. For example, the audio processing engine 120 may feed the frequency representation 128 to a plurality of neural network layers to generate the frequency representation vector 154. The frequency representation vector 154 may comprise numerical values representing the amplitudes of audio signals 202 in the audio snippet 138.

Generating a Feature Vector

In one embodiment, the audio processing engine 120 may generate a feature vector 156 from the frequency representation vector 154, where the feature vector 156 represents voice features 170 associated with one or more speakers 102 (e.g., the first speaker 102a and/or the second speaker 102b) who uttered one or more utterances 158 in the audio snippet 138. The audio processing engine 120 may generate the feature vector 156 by implementing a Machine Learning (ML) function 130.

In one embodiment, the audio processing engine 120 may generate the feature vector 156 by implementing a plurality of NN layers, CNN layers, LSTM layers, Bi-directional LSTM layers, RNN layers, Rectified Linear Units (ReLU) layer, Linear layer, and the like. In one embodiment, the audio processing engine 120 may generate the feature vector 156 by implementing a linear transformation to the frequency representation vector 154 to convert negative values to zero.

The feature vector 156 may comprise numerical values representing voice signatures or voice features 170 associated with the first speaker 102a and/or the second speaker 102b who uttered one or more utterances 158 in the audio snippet 138. The extracted voice features 170 may comprise one or more indications indicating tone, frequency range, pitch range, pauses in the speeches of the first speaker 102a and/or the second speaker 102b, among other indications. For example, the feature vector 156 may represent sequential relationships among the audio signals 202 in the audio snippet 138.

Comparing the Feature Vector with a Target Vector

The audio processing engine 120 may compare the feature vector 156 with the target vector 152, in a comparison operation 150, to determine whether the extracted voice features 170 from the feature vector 156 correspond to voice features 180 associated with the first speaker 102a from the target vector 152.

In one embodiment, the audio processing engine 120 may compare the feature vector 156 with the target vector 152 by performing an inner product (.) between the feature vector 156 with the target vector 152. A result from performing the inner product (.) between the feature vector 156 with the target vector 152 indicates a similarity or correspondence score 174. If the correspondence score 174 is more than a threshold score, e.g., 84%, the audio processing engine 120 determines that the feature vector 156 corresponds to the target vector 152. In other words, the audio processing engine 120 determines that one or more utterances 158 spoken in the audio snippet 138 are uttered by the first speaker 102a. If the audio processing engine 120 determines that the feature vector 156 does not correspond to the target vector 152, the audio processing engine 120 determines that the one or more utterances 158 spoken in the audio snippet 138 are not uttered by the first speaker 102a, and moves on to process the next audio snippet 138.

In one embodiment, the audio processing engine 120 may compare the feature vector 156 with the target vector 152 by applying a mathematical function on the feature vector 156 and the target vector 152, where the mathematical function may comprise a sum of vector products of numerical values in the feature vector 156 and the target vector 152. A difference between the sum of products of numerical values from the feature vector 156 and the sum of products of numerical values from the target vector 152 may correspond to the similarity or correspondence score 174 between the feature vector 156 and the target vector 152. For example, if the difference between the sum of vector products of numerical values from the feature vector 156 and the sum of vector products of numerical values from the target vector 152 is below a threshold range, the audio processing engine 120 determines that the feature vector 156 corresponds to the target vector 152.

In some embodiments, system 100 may be configured to identify one or more speakers 102 in one or more audio files 136. Since system 100 is configured to split an audio file 136 in a plurality of snippets 138 based on a probability of each audio snippet 138 comprising one or more utterances 158, system 100 may obviate the need for 1) determining speaker change points in the audio file 136 and 2) performing a speaker diarization, where the speaker diarization corresponds to partitioning the audio file into homogeneous segments, each containing the speech of a different speaker 102.

FIG. 2 illustrates an example representation of the first audio file 136a in a time domain. The lengths 204 of the audio snippets 138 may be probabilistically determined as described in FIG. 1. As such, the lengths 204 of the audio snippets 138 may vary based on a speech distribution pattern 148 associated with a speaker 102 that is desired to be identified. In the example of FIG. 2, the first audio snippet 138a has a first length 204a, the second snippet 138b has a second length 204b, and the third snippet 138n has a third length 204n. Each of these audio snippets 138 may have a different length 204 depending on whether one or more utterances 158 are detected in each audio snippet 138. Therefore, lengths 204 of the audio snippets 138 may non-deterministically vary depending on speech patterns of one or more speakers 102 during the audio file 136. In a particular example, lengths 204 may vary between any appropriate duration, such as four to six seconds, three to five seconds, etc.

Each audio snippet 138 may comprise one or more utterances 158 of one or more speakers 102. In the example of FIG. 2, the first audio snippet 138a comprises one or more utterances 158 of the first speaker 102a, the second audio snippet 138 comprises one or more utterances 158 of the second speaker 102b, and the third audio snippet comprises one or more utterances 158 of the first speaker 102a and the second speaker 102.

Example Method for Identifying a Particular Speaker in One or More Audio Files

Figure 3:
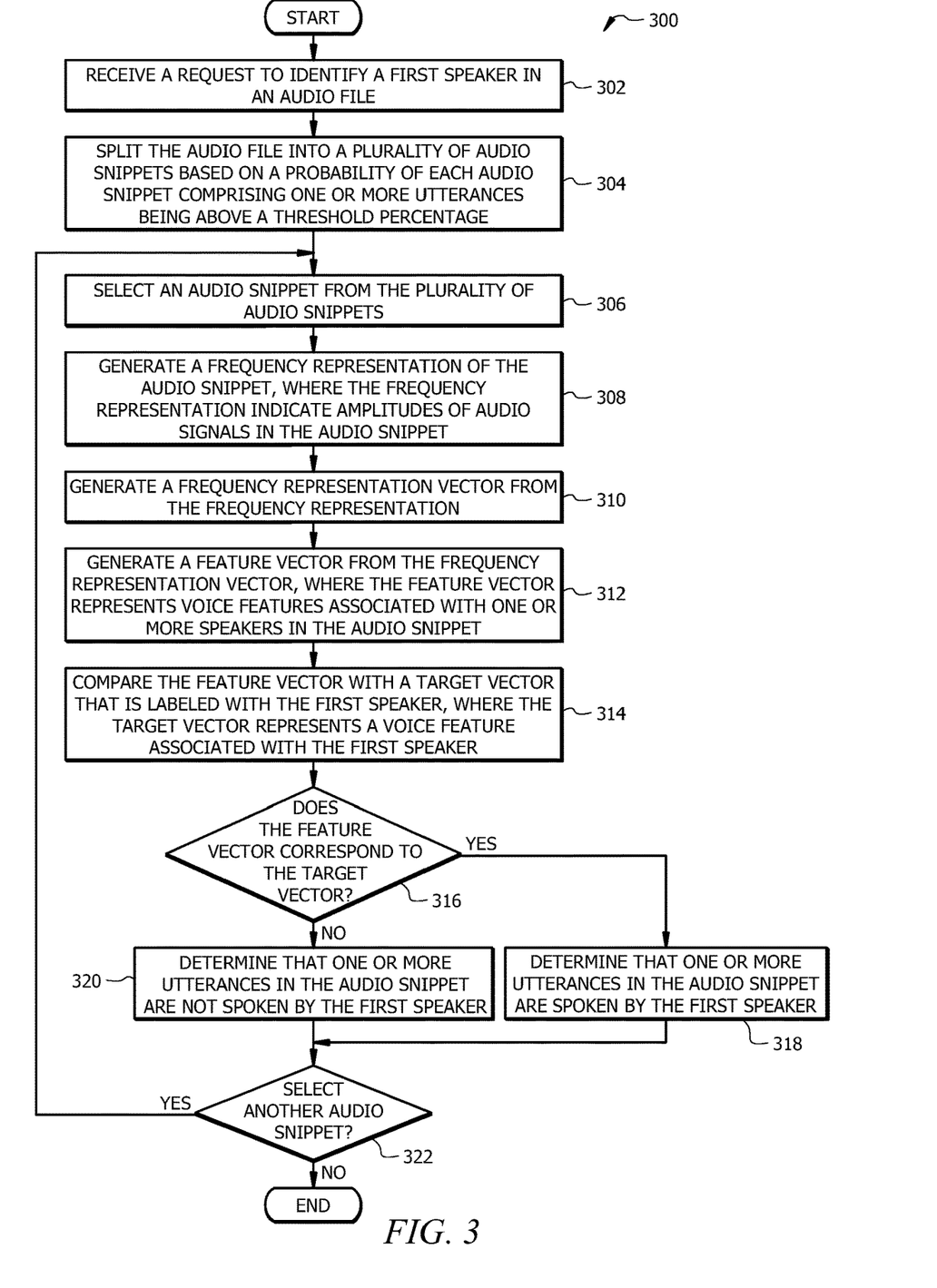
FIG. 3 illustrates an example flowchart of a method for identifying a speaker in one or more audio files.

FIG. 3 illustrates an example flowchart of a method 300 for identifying a particular speaker 102 in one or more audio files 136. Modifications, additions, or omissions may be made to method 300. Method 300 may include more, fewer, or other steps. For example, steps may be performed in parallel or in any suitable order. While at times discussed as the system 100, processor 112, audio processing engine 120, or components of any of thereof performing steps, any suitable system or components of the system may perform one or more steps of the method 300. For example, on or more steps of method 300 may be implemented, at least in part, in the form of software instructions 134 of FIG. 1, stored on non-transitory, tangible, machine-readable media (e.g., memory 132 of FIG. 1) that when run by one or more processors (e.g., processor 112 of FIG. 1) may cause the one or more processors to perform steps 302-322.

Method 300 begins at step 302 where the audio processing engine 120 receives a request to identify a particular speaker 102, such as the first speaker 102a in one or more audio files 136. For example, the audio processing engine 120 may receive the request from a user to determine whether one or more audio files 136 contain speech of the first speaker 102a. As such, the audio processing engine 120 may select each audio file 136 for processing and determining whether it contains the speech of the first speaker 102a. For example, assume that the audio processing engine 120 selects the first audio file 136a from one or more audio files 136 for processing. Once the audio processing engine 120 determined whether the first audio file 136a contains speech of the first speaker 102a (at the end of the method 300), the audio processing engine 120 may select another audio file 136, for example, the second audio file 136b for processing. The audio processing engine 120 selects an audio file 136 until no audio file 136 is left for processing.

At step 304, the audio processing engine 120 splits the audio file 136 into a plurality of audio snippets 138 based on a probability of each audio snippet 138 comprising one or more utterances 158 being above a threshold percentage. For example, the audio processing engine 120 may determine a length 204 for each audio snippet 138, such that a probability of detecting at least one utterance 158 in above a threshold number of slices 162 in a row being above a threshold percentage, e.g., 80%, similar to that described in FIGS. 1 and 2. The lengths 204 of the audio snippets 138 may vary based on speech distribution patterns 148 associated with speakers 102 in the audio file 136. For example, the lengths 204 may vary between four to six seconds, four to ten seconds, or any other durations.

At step 306, the audio processing engine 120 selects an audio snippet 138 from the plurality of audio snippets 138. Here, the audio processing engine 120 iteratively selects an audio snippet 138 from the plurality of audio snippets 138 until no audio snippet 138 is left for processing. The audio processing engine 120 may select an audio snippet 138 from the plurality of audio snippet 138 if at least one audio snippet 138 is left.

In one embodiment, the audio processing engine 120 may truncate the audio file 136 to determine whether the truncated audio file 136 contains the speech of the first speaker 102a. The audio processing engine 120 may truncate the audio file 136 similar to that described in FIG. 1.

In one embodiment, the audio processing engine 120 may upsample the audio snippet 138 by multiplying the sampling frequency of the audio snippet 138 by an integer, similar to that described in FIG. 1.

At step 308, the audio processing engine 120 generates a frequency representation 128 from the audio snippet 138, where the frequency representation 128 indicates amplitudes or power spectrum of audio signals 202 in the audio snippet 138. For example, the audio processing engine 120 may generate the frequency representation 128 by taking an FFT from the audio snippet 138, performing a DCT on the audio snippet 138, filtering the audio snippet 138, etc. In a particular example, the frequency representation 128 may correspond to the MFCC representation of the audio snippet 138.

At step 310, the audio processing engine 120 generates a frequency representation embedding or vector 154 from the frequency representation 128. For example, the audio processing engine 120 may generate the frequency representation vector 154 by performing a vectorization operation on the frequency representation 128. In the vectorization operation, the audio processing engine 120 may feed the frequency representation 128 to a plurality of neural networks to generate the frequency representation vector 154.

At step 312, the audio processing engine 120 generates a feature vector 156 from the frequency representation vector 154, where the feature vector 156 represents voice features 170 associated with one or more speakers 102 in the audio snippet 138. For example, the audio processing engine 120 may generate the feature vector 156 by feeding the frequency representation vector 154 to a plurality of neural networks. For example, in this process, the audio processing engine 120 may perform a linear transformation on the frequency representation vector 154 to convert negative values to zero.

At step 314, the audio processing engine 120 compares the feature vector 156 with a target vector 152 that is labeled with the first speaker 102a, where the target vector 152 represents a voice feature 180 associated with the first speaker 102a. For example, the audio processing engine 120 may perform an inner product (.) between the feature vector 156 and the target vector 152, similar to that described in FIG. 1.

At step 316, the audio processing engine 120 determines whether the feature vector 156 corresponds to the target vector 152. If the audio processing engine 120 determines that the feature vector 156 corresponds to the target vector 152, method 300 proceeds to step 318. If, however, the audio processing engine 120 determines that the feature vector 156 does correspond to the target vector 152, method 300 may proceed to step 320.

In this process, the audio processing engine 120 determines the result from performing the inner product (.) described in step 314. The result from performing the inner product (.) between the feature vector 156 and the target vector 152 may indicate the similarity or correspondence score 174. If the audio processing engine 120 determines that the correspondence score 174 is above a threshold score, e.g., 84%, the audio processing engine 120 determines that the feature vector 156 corresponds to the target vector 152. Otherwise, the audio processing engine 120 determines that the feature vector 156 does not correspond to the target vector 152.

At step 318, the audio processing engine 120 determines that one or more utterances 158 in the audio snippet 138 are spoken by the first speaker 102a.

At step 320, the audio processing engine 120 determines that the one or more utterances 158 in the audio snippet 138 are not spoken by the first speaker 102a.

At step 322, the audio processing engine 120 determines whether to select another audio snippet 138. The audio processing engine 120 determines to select another audio snippet 138 if at least one audio snippet 138 is left for processing. If the audio processing engine 120 determines to select another audio snippet 138, method 300 returns to step 306. Otherwise, method 300 terminates. In one embodiment, method 300 may be modified to determine whether the audio file 136 contains the speech of the first speaker 102. As such, at step 318, once the audio processing engine 120 determines that one or more utterances 158 in the audio snippet 138 are spoken by the first speaker 102a, method 300 may terminate and move on to process the next audio file 136, e.g., the second audio file 136b.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for identifying a speaker in a multi-speaker environment, comprising:
a memory operable to store an audio file comprising a conversation among at least two speakers comprising a first speaker and a second speaker;
a processor, operably coupled with the memory, configured to:
receive a request to identify the first speaker in the audio file;
split the audio file into a plurality of audio snippets based at least in part upon a probability of each audio snippet comprising one or more utterances being above a threshold percentage;
for each audio snippet from the plurality of audio snippets:
generate a frequency representation of the audio snippet in a time domain, wherein the frequency representation indicate amplitudes of audio signals in the audio snippet;
generate, from the frequency representation, a feature vector of numerical values representing voice features associated with one or both of the first speaker and the second speaker, wherein a voice feature associated with a particular speaker comprises at least one of a frequency range, a speech distribution pattern, and speech pauses associated with the particular speaker;
compare the feature vector with a target vector labeled with the first speaker, wherein the target vector comprises numerical values representing a voice feature associated with the first speaker;
determine whether the feature vector corresponds to the target vector; and
in response to determining that the feature vector corresponds to the target vector, determine that one or more utterances in the audio snippet are spoken by the first speaker.

2. The system of claim 1, wherein the processor is further configured to truncate the audio file by applying a probability distribution function to the audio file based at least in part upon a probability of the truncated audio file comprising one or more utterances of the first speaker being above a threshold percentage.

3. The system of claim 1, wherein splitting the audio file into the plurality of audio snippets comprises:
for each audio snippet from the plurality of audio snippet:
determining a first duration in the audio snippet that comprises one or more utterances;
determining a second duration in the audio snippet that does not comprises an utterance; and
determining a length of the audio snippet such that a ratio of the first duration over the second duration is above a threshold percentage.

4. The system of claim 1, wherein the processor is further configured to upsample the audio file such that a sampling frequency of audio signals in the audio file is multiplied by an integer.

5. The system of claim 1, wherein splitting the audio file into the plurality of audio snippets comprises non-deterministically splitting the audio file into the plurality of audio snippets, such that a duration of each audio snippet from the plurality of audio snippets is probabilistically determined to ascertain how short each audio snippet can be to include one or more utterances.

6. The system of claim 1, wherein comparing the feature vector with the target vector labeled with the first speaker comprises:
applying a mathematical function to the feature vector and the target vector, wherein the mathematical function comprises a sum of vector products;
determining a first result from applying the mathematical function to the feature vector;
determining a second result from applying the mathematical function to the target vector; and
comparing the first result with the second result.

7. The system of claim 6, wherein determining whether the feature vector corresponds to the target vector comprises determining whether the first result is within a threshold range from the second result.

8. The system of claim 1, wherein determining whether the feature vector corresponds to the target vector comprises:
determining a correspondence score between the feature vector and the target vector by performing an inner product between the feature vector and the target vector;
determining whether the correspondence score is above a threshold percentage; and
in response to determining that the correspondence score is above the threshold percentage, determine that the feature vector corresponds to the target vector.

9. A method for identifying a speaker in a multi-speaker environment, comprising:
receiving a request to identify a first speaker in an audio file comprising a conversation among two or more speakers comprising the first speaker and a second speaker;
splitting the audio file into a plurality of audio snippets based at least in part upon a probability of each audio snippet comprising one or more utterances being above a threshold percentage;
for each audio snippet from the plurality of audio snippets:
generating a frequency representation of the audio snippet in a time domain, wherein the frequency representation indicate amplitudes of audio signals in the audio snippet;
generating, from the frequency representation, a feature vector of numerical values representing voice features associated with one or both of the first speaker and the second speaker, wherein a voice feature associated with a particular speaker comprises at least one of a frequency range, a speech distribution pattern, and speech pauses associated with the particular speaker;
comparing the feature vector with a target vector labeled with the first speaker, wherein the target vector comprises numerical values representing a voice feature associated with the first speaker;
determining whether the feature vector corresponds to the target vector; and
in response to determining that the feature vector corresponds to the target vector, determining that one or more utterances in the audio snippet are spoken by the first speaker.

10. The method of claim 9, further comprising in response to determining that the feature vector does not correspond to the target vector, determining that one or more utterances in the audio snippet are not spoken by the first speaker.

11. The method of claim 9, further comprising truncating the audio file by applying a probability distribution function to the audio file based at least in part upon a probability of the truncated audio file comprising one or more utterances of the first speaker being above a threshold percentage.

12. The method of claim 9, wherein splitting the audio file into the plurality of audio snippets comprises:
for each audio snippet from the plurality of audio snippet:
determining a first duration in the audio snippet that comprises one or more utterances;
determining a second duration in the audio snippet that does not comprise an utterance; and
determining a length of the audio snippet such that a ratio of the first duration over the second duration is above a threshold percentage.

13. The method of claim 9, wherein splitting the audio file into the plurality of audio snippets comprises non-deterministically splitting the audio file into the plurality of audio snippets, such that a duration of each audio snippet from the plurality of audio snippets is probabilistically determined to ascertain how short each audio snippet can be to include one or more utterances.

14. The method of claim 9, wherein determining whether the feature vector corresponds to the target vector comprises:
determining a correspondence score between the feature vector and the target vector by performing an inner product between the feature vector and the target vector;
determining whether the correspondence score is above a threshold percentage; and
in response to determining that the correspondence score is above the threshold percentage, determine that the feature vector corresponds to the target vector.

15. A computer program comprising executable instructions stored in a non-transitory computer-readable medium that when executed by a processor causes the processor to:
receive a request to identify a first speaker in an audio file comprising a conversation among two or more speakers comprising the first speaker and a second speaker;
split the audio file into a plurality of audio snippets based at least in part upon a probability of each audio snippet comprising one or more utterances being above a threshold percentage;
for each audio snippet from the plurality of audio snippets:
generate a frequency representation of the audio snippet in a time domain, wherein the frequency representation indicate amplitudes of audio signals in the audio snippet;
generate, from the frequency representation, a feature vector of numerical values representing voice features associated with one or both of the first speaker and the second speaker, wherein a voice feature associated with a particular speaker comprises at least one of a frequency range, a speech distribution pattern, and speech pauses associated with the particular speaker;
compare the feature vector with a target vector labeled with the first speaker, wherein the target vector comprises numerical values representing a voice feature associated with the first speaker;
determine whether the feature vector corresponds to the target vector; and
in response to determining that the feature vector corresponds to the target vector, determine that one or more utterances in the audio snippet are spoken by the first speaker.

16. The computer program of claim 15, wherein the processor is further configured to in response to determining that the feature vector does not correspond to the target vector, determine that one or more utterances in the audio snippet are not spoken by the first speaker.

17. The computer program of claim 15, wherein the processor is further configured to truncate the audio file by applying a probability distribution function to the audio file based at least in part upon a probability of the truncated audio file comprising one or more utterances of the first speaker being above a threshold percentage.

18. The computer program of claim 15, wherein splitting the audio file into the plurality of audio snippets comprises:
for each audio snippet from the plurality of audio snippet:
determining a first duration in the audio snippet that comprises one or more utterances;
determining a second duration in the audio snippet that does not comprise an utterance; and
determining a length of the audio snippet such that a ratio of the first duration over the second duration is above a threshold percentage.

19. The computer program of claim 15, wherein splitting the audio file into the plurality of audio snippets comprises non-deterministically splitting the audio file into the plurality of audio snippets, such that a duration of each audio snippet from the plurality of audio snippets is probabilistically determined to ascertain how short each audio snippet can be to include one or more utterances.

20. The computer program of claim 15, wherein determining whether the feature vector corresponds to the target vector comprises:
determining a correspondence score between the feature vector and the target vector by performing an inner product between the feature vector and the target vector;
determining whether the correspondence score is above a threshold percentage; and
in response to determining that the correspondence score is above the threshold percentage, determine that the feature vector corresponds to the target vector.

\* \* \* \* \*